(12) United States Patent
Ni et al.

(10) Patent No.: US 12,381,975 B2
(45) Date of Patent: Aug. 5, 2025

(54) CALL IDENTITY AUTHENTICATION METHOD, TERMINAL AND COMPUTER-READABLE STORAGE MEDIUM

(71) Applicant: ZTE CORPORATION, Shenzhen (CN)

(72) Inventors: Qingyu Ni, Shenzhen (CN); Guoqiang Chen, Shenzhen (CN); Linna Wu, Shenzhen (CN); Minggang Gao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 339 days.

(21) Appl. No.: 18/004,195

(22) PCT Filed: Jun. 21, 2021

(86) PCT No.: PCT/CN2021/101253
§ 371 (c)(1),
(2) Date: Jan. 4, 2023

(87) PCT Pub. No.: WO2022/017097
PCT Pub. Date: Jan. 27, 2022

(65) Prior Publication Data
US 2023/0247133 A1    Aug. 3, 2023

(30) Foreign Application Priority Data
Jul. 21, 2020    (CN) .......................... 202010703295.4

(51) Int. Cl.
H04M 11/00    (2006.01)
G06F 21/32    (2013.01)
(Continued)

(52) U.S. Cl.
CPC ........ H04M 3/42059 (2013.01); G06F 21/32 (2013.01); H04W 12/06 (2013.01); H04W 12/69 (2021.01)

(58) Field of Classification Search
CPC ............. H04M 3/42059; H04W 12/69; H04W 12/1206; G06F 21/32
See application file for complete search history.

(56) References Cited

U.S. PATENT DOCUMENTS 9,468,033 B2    10/2016    Naqvi et al.
2006/0034287 A1*    2/2006    Novack ................. H04W 12/08
                                                                713/168
(Continued)

FOREIGN PATENT DOCUMENTS

CN    1960254 A    5/2007
CN    107690002 A    2/2018
(Continued)

OTHER PUBLICATIONS

European Patent Office. Extended European Search Report for EP Application No. 21846435.2, mailed Oct. 13, 2023, pp. 1-8.
(Continued)

*Primary Examiner* — Simon King
(74) *Attorney, Agent, or Firm* — Vivacqua Crane, PLLC (57) ABSTRACT

A call identity authentication method, a terminal device and a computer-readable storage medium are disclosed. The method may include: in response to receiving a call setup request from a calling terminal device, acquiring biometric authentication information sent from the calling terminal device through a fifth generation (5G) message (S100); obtaining an authentication result according to the biometric authentication information (S200); and displaying authentication notification information according to the authentication result (S300).

15 Claims, 8 Drawing Sheets

(51) Int. Cl.
*H04M 3/42* (2006.01)
*H04W 12/06* (2021.01)
*H04W 12/69* (2021.01)

(56) References Cited

U.S. PATENT DOCUMENTS

| | | | | |
|---|---|---|---|---|
| 2006/0036442 | A1* | 2/2006 | Novack | G07C 9/37 |
| | | | | 704/E17.003 |
| 2013/0084831 | A1 | 4/2013 | Suryanarayana et al. | |
| 2014/0205077 | A1* | 7/2014 | Wood | H04M 3/42042 |
| | | | | 379/142.01 |
| 2018/0295140 | A1 | 10/2018 | Lu et al. | |
| 2019/0020759 | A1 | 1/2019 | Kuang | |
| 2020/0092759 | A1 | 3/2020 | Dasgupta et al. | |
| 2021/0029540 | A1* | 1/2021 | Sodano | H04L 67/306 |
| 2021/0258275 | A1* | 8/2021 | Starsinic | H04L 67/12 |
| 2021/0377836 | A1* | 12/2021 | Hu | H04W 48/16 |
| 2022/0116770 | A1* | 4/2022 | Li | H04L 63/0861 |

FOREIGN PATENT DOCUMENTS

| | | |
|---|---|---|
| CN | 108923930 A | 11/2018 |
| WO | 2020146076 A1 | 7/2020 |

OTHER PUBLICATIONS

Huang, J. "Rebuilding Unicorns: The Digital Economy Era Enterprise Upgrading," China Railway Press, 2020, pp. 49-52.

The State Intellectual Property Office of People's Republic of China. First Office Action for CN Application No. 202010703295.4 and English translation, mailed Dec. 12, 2024, pp. 1-22.

The State Intellectual Property Office of People's Republic of China. First Search Report for CN Application No. 202010703295.4 and English translation, mailed Dec. 10, 2024, pp. 1-4.

International Searching Authority. International Search Report and Written Opinion for PCT Application No. PCT/CN2021/101253 and English translation, mailed Sep. 13, 2021, pp. 1-9.

* cited by examiner

CALL IDENTITY AUTHENTICATION METHOD, TERMINAL AND COMPUTER-READABLE STORAGE MEDIUM

CROSS-REFERENCE TO RELATED APPLICATION

This application is a national stage filing under 35 U. S.C. § 371 of international application number PCT/CN2021/101253, filed Jun. 21, 2021, which claims priority to Chinese patent application No. 202010703295.4 filed Jul. 21, 2020. The contents of these applications are incorporated herein by reference in their entirety.

TECHNICAL FIELD

Embodiments of the present disclosure relate to, but are not limited to, the field of communications, and in particular to a call identity authentication method, a terminal device, and a computer-readable storage medium.

BACKGROUND

With the development and commercialization of the Fifth Generation (5G) mobile communications technology, 5G messages is beginning to gradually replace conventional text messages. The 5G message is the application of Rich Communication Suite (RCS) in 5G. Based on the advantages of high data rate and low latency of 5G, a user can send a variety of rich media contents such as videos and pictures through the 5G message, greatly improving the convenience of communications and having a broad application prospect.

However, as the convenience of communications increases, there are more and more unlawful acts, such as telephone harassment, telephone scams, or theft of privacy of individuals by using videos. For existing voice calls or video calls, only call identification is available before connection, and the identity of a caller can only be authenticated through sounds or videos after the connection, being detrimental to user experience.

SUMMARY

The following is a summary of the subject matters described in detail. This summary is not intended to limit the scope of protection of the appended claims.

Embodiments of the present disclosure provide a 5G message-based call identity authentication method, a terminal device, and a computer-readable storage medium.

An embodiment in accordance with an aspect of the present disclosure provides a call identity authentication method, applied to a called terminal device, the method may include: in response to receiving a call setup request from a calling terminal device, acquiring biometric authentication information sent from the calling terminal device through a 5G message; obtaining an authentication result according to the biometric authentication information; and displaying authentication notification information according to the authentication result.

An embodiment in accordance with another aspect of the present disclosure provides a call identity authentication method, applied to a calling terminal device, the method may include: sending a call setup request to a called terminal device; acquiring biometric authentication information; and sending the biometric authentication information to the called terminal device through a 5G message so that the called terminal device acquires an authentication result according to the biometric authentication information and displays authentication notification information according to the authentication result.

An embodiment in accordance with yet another aspect of the present disclosure provides a terminal device, which may include: a memory, a processor, and a computer program stored in the memory and executable by the processor, where the computer program, when executed by the processor, causes the processor to perform the call identity authentication method described above.

An embodiment in accordance with still another aspect of the present disclosure provides a computer-readable storage medium storing computer-executable instructions, where the computer-executable instructions are configured to implement any of the call identity authentication methods described above.

Additional features and advantages of the present disclosure will be set forth in the subsequent description, and in part will become apparent from the description, or may be learned by practice of the present disclosure. The purposes and other advantages of the present disclosure can be realized and obtained by structures particularly noted in the description, the claims and the accompanying drawings.

BRIEF DESCRIPTION OF DRAWINGS

The accompanying drawings are used to provide further understanding of the technical schemes of the present disclosure and constitute a part of the description. The accompanying drawings are used to explain the technical schemes of the present disclosure together with the embodiments of the present disclosure, and do not constitute a restriction on the technical schemes of the present disclosure.

DETAILED DESCRIPTION

In order to make the objectives, technical schemes and advantages of the present disclosure more apparent, the present disclosure is further described in detail in conjunction with the accompanying drawings and embodiments. It should be understood that the particular embodiments described herein are only intended to explain the present disclosure, and are not intended to limit the present disclosure.

It is to be noted that although a functional module division is shown in the schematic diagrams of the device and a logical order is shown in the flowcharts, the steps shown or described may be executed, in some cases, in a different module division from that of the device or in a different order from that in the flowcharts. The terms "first", "second", etc. in the description, the claims or the above-mentioned drawings are intended to distinguish between similar objects and are not necessarily to describe a specific order or sequence.

The present disclosure provides a call identity authentication method, a terminal device, and a computer-readable storage medium. In response to a call setup request being received from a calling terminal device, biometric authentication information sent from the calling terminal device is acquired through a 5G message. An authentication result is obtained according to the biometric authentication information, and authentication notification information is displayed according to the authentication result. According to the technical schemes provided by embodiments of the present disclosure, identity authentication can be done through a 5G message before a call is set up, improving the user experience.

The embodiments of the present disclosure will be further explained below with reference to the accompanying drawings.

Figure 1:
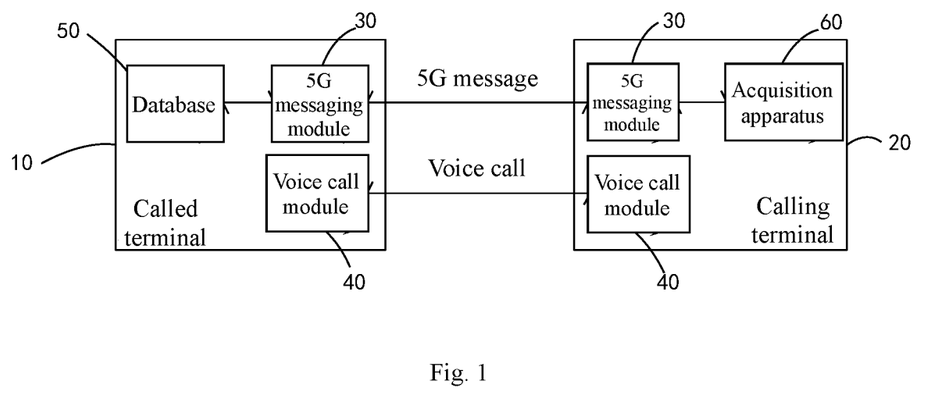
FIG. 1 is a schematic diagram of a terminal device for executing a call identity authentication method according to an embodiment of the present disclosure.

As shown in FIG. 1, FIG. 1 is a schematic diagram of a terminal device for performing a call identity authentication method according to an embodiment of the present disclosure.

In the example in FIG. 1, a called terminal device 10 and a calling terminal device 20 are included. The called terminal device 10 is communicatively connected to the calling terminal device 20. It is to be noted that the called terminal device 10 and the calling terminal device 20 may be any device, such as a common mobile phone, a tablet computer, a smart wearable device, etc., as long as the device can achieve communications of 5G messages based on RCS and set up voice calls, and is not specifically limited in this embodiment. It is to be noted that the called terminal device 10 and the calling terminal device 20 may be the same type devices or different type devices as long as the device can achieve communications of 5G messages and set up voice calls.

It is to be noted that the called terminal device 10 and the calling terminal device 20 each include a 5G messaging module 30 and a voice call module 40, and the called terminal device 10 also includes a database 50, where the 5G messaging module 30 is configured to perform data interchange through a 5G message, the voice call module 40 is configured to perform conventional voice calls, and the database 50 is used for storing data related to biometric authentication information. It is to be noted that the calling terminal device 20 also includes an acquisition apparatus 60. The acquisition apparatus 60 may be a common camera, a microphone, a fingerprint acquisition device, etc. The above devices adopt the structures in some cases in the art, and the present disclosure does not relate to the improvement of the specific devices. It is to be noted that the above modules can adopt the structures in some cases in the art, and the present disclosure only improves the application of the functions, and does not improve the circuit structures of the specific modules. The details are not repeated herein.

Those having ordinary skill in the art may understand that the called terminal device 10 and the calling terminal device 20 shown in FIG. 1 do not constitute a limitation on the embodiments of the present disclosure and may include more or fewer components than illustrated, or combine some of the components, or use a different arrangement of the components.

Based on the above terminal devices, various embodiments of the call identity authentication method of the present disclosure are presented below.

Figure 2:
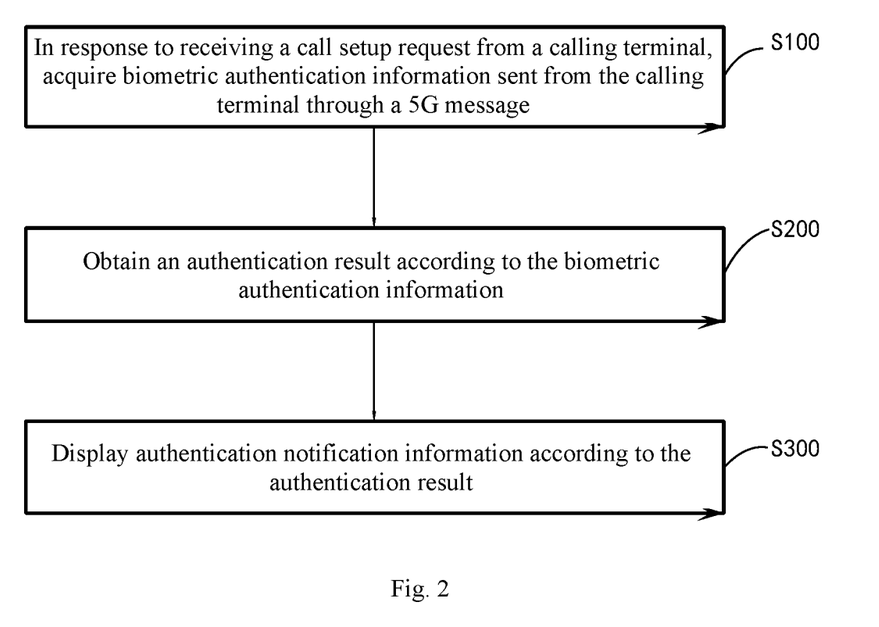
FIG. 2 is a flowchart illustrating a called terminal device executing a call identity authentication method according to another embodiment of the present disclosure.

As shown in FIG. 2, FIG. 2 is a flowchart illustrating a called terminal device performing a call identity authentication method according to another embodiment of the present disclosure. The call identity authentication method includes, but is not limited to, steps S100, S200 and S300.

At S100, in response to receiving a call setup request from a calling terminal device, biometric authentication information sent from the calling terminal device is acquired through a 5G message.

In an embodiment, the call setup request may be a common voice call setup request or a VoIP call setup request as long as a call connection between the calling terminal device and the called terminal device can be set up. This is not limited in this embodiment of the present disclosure.

In an embodiment, the biometric authentication information may be any biometric feature that can be acquired and sent through the calling terminal device. For example, the biometric authentication information may be a unique biometric feature such as a human face image, a video containing a human face, voices or fingerprints of the caller captured by the camera of the calling terminal device. This is not limited in this embodiment of the present disclosure. It is to be noted that in addition to the biometric authentication information, other types of authentication information may also be used according to actual needs, such as sending a text message or a picture through the calling terminal device, which will not be described in detail here.

In an embodiment, 5G messaging function based on the RCS can send multimedia information by using data traffic, and the biometric authentication information such as images, videos or voices is essentially multimedia information. Therefore, the biometric authentication information can be interchanged through a 5G message during the call setup process. It is to be noted that, unlike common apps, 5G messaging function is a system application, and can better interact with various modules in the terminal device without requiring complicated user authorization, such as access to a database having a relatively high privacy level. In this embodiment, the acquired biometric authentication information can be stored to the database having a high privacy level to avoid leakage of user privacy and improve communication security. It is to be noted that, 5G messaging function, as a system function, may be turned on or off. To execute the call identity authentication method in this embodiment, we assume by default that the 5G messaging function of the called terminal device is turned on. If the 5G messaging function is turned off, the biometric authentication information cannot be acquired through the 5G message, which is not within the discussion scope of this embodiment, and a conventional voice call procedure is performed, which will not be described in detail here.

In an embodiment, it is also feasible to set up a whitelist in the called terminal device, for example, to select a user or a phone number in the address book and set it as a whitelist user. When the call setup request sent by the user through the calling terminal device is received, there is no need to perform biometric feature authentication and a conventional voice call procedure is performed directly, sparing some frequent contacts the trouble of verification and simplifying the operations.

At S200, an authentication result is obtained according to the biometric authentication information.

In an embodiment, the biometric authentication information may be identified in any identification method in some cases in the field, such as common image identification, voice identification, etc. This embodiment does not relate to the specific improvement of the identification method, and the existing identification methods can be used according to specific biological features, which will not be described in detail here.

It is to be noted that, since the biometric feature identification may have errors, standards of the authentication result in this embodiment can be adjusted according to actual needs. For example, a percentage threshold for face identification similarity is set, if the percentage threshold is met, the authentication result indicates consistency; otherwise, the authentication result indicates inconsistency. The specific standards can be adjusted according to the actual biological features.

At S300, authentication notification information is displayed according to the authentication result.

In an embodiment, the terminal devices usually have displays or monitors for displaying the authentication notification information at any position, which will not be described in detail herein. It is to be noted that the authentication notification information may include the authentication result and operation information related to the authentication result. For example, a notification of "The features of the other party are consistent with that in the last call." can be displayed, and the specific display contents can be adjusted according to actual needs. It is to be understood that it is feasible to display operation buttons in the called terminal device while the authentication notification information is displayed, and prompt the called subscriber to operate in response to the call setup request, such as the commonly used Accept and Decline buttons. It is to be understood that display preset expressions may be set according to specific authentication results, such as a smiley face if the authentication is passed or a danger sign if the authentication is failed. The expressions can be selected according to actual needs.

It is to be noted that the authentication notification information in this embodiment is used only for notifying the user, and the user can choose to answer or decline the call according to the authentication notification information.

Figure 3:
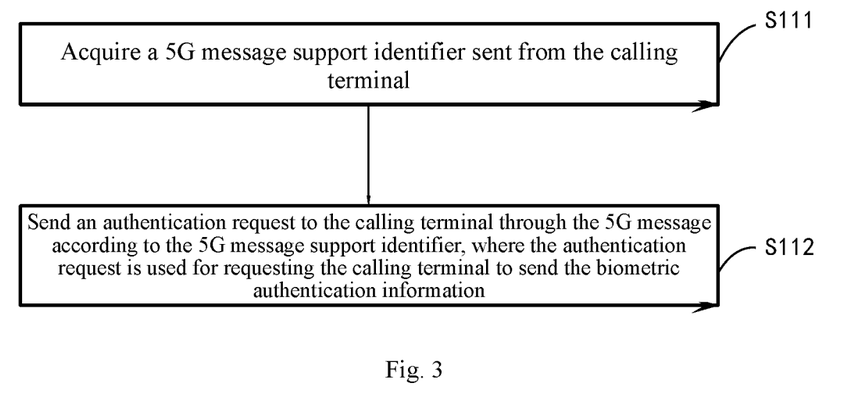
FIG. 3 is a flowchart illustrating a called terminal device sending an authentication request according to another embodiment of the present disclosure.

Referring to FIG. 3, in an embodiment, S100 includes, but is not limited to, the following steps.

At S111, a 5G message support identifier sent from the calling terminal device is acquired.

At S112, an authentication request is sent to the calling terminal device through the 5G message according to the 5G message support identifier, where the authentication request is used for requesting the calling terminal device to send the biometric authentication information.

In an embodiment, the called terminal device may acquire the 5G message support identifier of the calling terminal device before receiving the call request; or when receiving the call setup request, which can be adjusted according to the way in which the calling terminal device sends the 5G message support identifier.

In an embodiment, the authentication request may be sent after the called terminal device receives the 5G message identifier to ensure that the calling terminal device supports the 5G message to complete subsequent operations and reduce unnecessary data transmission. Of course, the authentication request may also be directly sent after the called terminal device receives the call setup request. The sending method can be selected according to actual needs.

In an embodiment, the authentication request may include any contents, such as only a request signal to request the calling terminal device to acquire the biometric authentication information upon receiving the authentication request; or may include requirements for types and parameters of the biometric authentication information, such as a request to the calling terminal device for acquiring videos or images as the biometric authentication information, a video duration and an image resolution, which can be selected according to actual needs.

Figure 4:
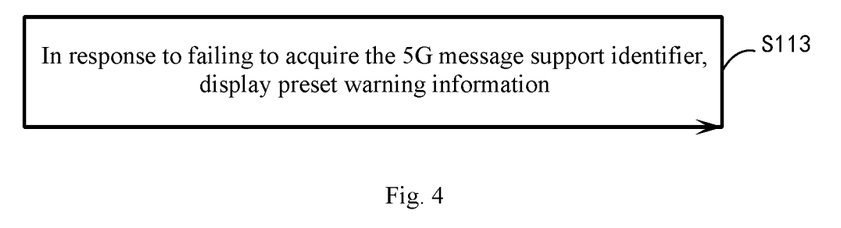
FIG. 4 is a flowchart illustrating a called terminal device displaying preset warning information according to another embodiment of the present disclosure.

Referring to FIG. 4, in an embodiment, S100 includes, but is not limited to, the following step.

At S113, in response to the 5G message support identifier failing to be acquired, preset warning information is displayed.

In an embodiment, the 5G message support ID failing to be acquired may be caused by the fact that the calling terminal device does not support the 5G messaging function, or that the calling terminal device turns off the 5G messaging function. In this case, the calling terminal device cannot send the biometric authentication information through the 5G message. On this basis, the preset warning information, for example, "The other party's mobile phone does not support the function of real-time identity authentication. Please be cautious with strangers!" may be displayed on the called terminal device. The specific prompt contents can be adjusted according to actual needs.

Figure 5:
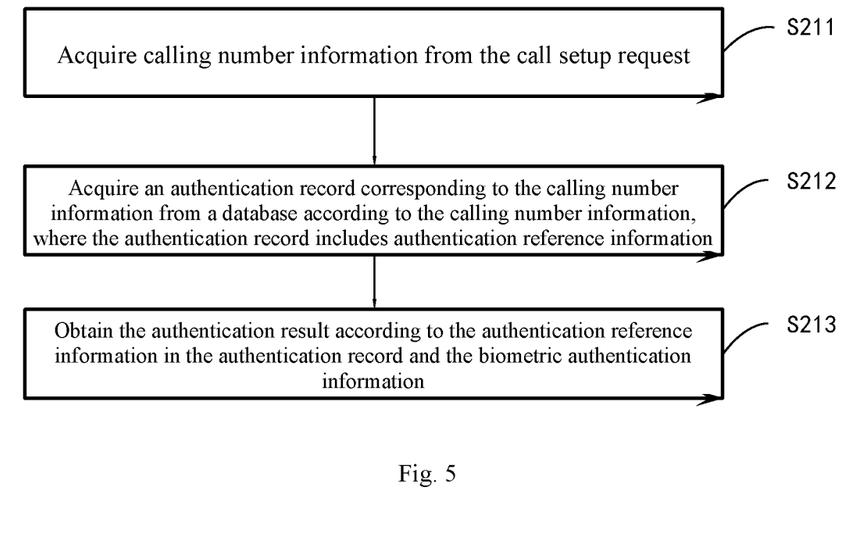
FIG. 5 is a flowchart illustrating a called terminal device executing authentication according to another embodiment of the present disclosure.

Referring to FIG. 5, in an embodiment, S200 includes, but is not limited to, the following steps.

At S211, calling number information is acquired from the call setup request.

At S212, an authentication record corresponding to the calling number information is acquired from a database according to the calling number information, where the authentication record includes authentication reference information.

At S213, the authentication result is obtained according to the authentication reference information in the authentication record and the biometric authentication information.

In an embodiment, the calling number information may be a common telephone number, or may be identification information in a VoIP call, such as a user name. This embodiment does not impose restrictions on the calling number information as long as it can be used to identify the unique caller. It is to be noted that, since authentication records of different callers are different, to distinguish the callers, different authentication records can be generated in the database of the called terminal device according to the calling number information. When the call setup request is received and the authentication is acquired, the authentication record is retrieved from the database by finding a match according to the calling number information.

In an embodiment, the database may include any type of information, for example, as shown in Table 1, the authentication records include telephone numbers, whether the caller is within the mobile phone contact list, whether the last call was answered, and picture/video storage data. It is to be noted that each piece of calling number information may have multiple pieces of authentication reference information, for example, as shown in Table 1, both image data and video data may be stored. Before the authentication starts, the corresponding authentication reference information is selected according to the type of biometric authentication information sent from the calling terminal device. It is to be noted that, to improve the matching convenience, when the authentication reference information is stored, it is feasible to name the authentication reference information with the calling number information. For example, the image shown in Table 1 is named "12455244422.jpg". The specific naming method can be adjusted according to actual needs.

The technical schemes of this embodiment are exemplified by a specific example in conjunction with Table 1 below.

For example, three telephone numbers and authentication records corresponding to the three telephone numbers as shown in Table 1 are stored in the database of the called terminal device. After receiving the call setup request and acquiring the calling number "12455244422" from the call setup request, the called terminal device reads the first authentication record corresponding to "12455244422" in Table 1. The reference authentication information is image "12455244422.jpg" and video "12455244422.avi". If the received biometric authentication information is an image, the image is identified in the existing identification method by using image "12455244422.jpg" as the reference authentication information to obtain the corresponding authentication result.

TABLE 1

Example of database of the called terminal device

| Phone number | Is the number in the contact list? | Was the last call answered? | Image/video storage data |
| --- | --- | --- | --- |
| 12455244422 | Yes | Answered | 12455244422.jpg, 12455244422.avi |
| 12458888888 | No | Declined | 12458888888.jpg, 12458888888.avi |
| 12458999999 | No | Declined | 12458999999.jpg, 12458999999.avi |

In an embodiment, because the 5G messaging function is a system application of the terminal device and has relatively high access authority, to improve data security, the database can be a database invisible to the user to prevent the contents in the database from being tampered. The specific type of the database can be selected according to actual needs, on which this embodiment does not impose restrictions.

Figure 6:
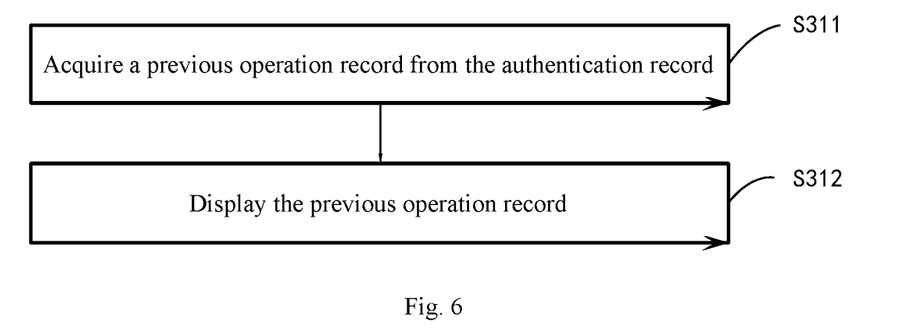
FIG. 6 is a flowchart illustrating a called terminal device acquiring and displaying a previous operation record according to another embodiment of the present disclosure.

Referring to FIG. 6, in an embodiment, S300 includes, but is not limited to, the following steps.

At S311, a previous operation record is acquired from the authentication record.

At S312, the previous operation record is displayed.

In an embodiment, referring to the above Table 1, the previous operation record may be whether the last call was answered, or may be an operation of further authentication. For example, if the authentication fails through an image, further authentication is performed through a video, on which this embodiment does not impose restrictions. It is to be noted that, one or more previous operation records may be provided. For example, there are multiple call records for the same phone number, operations of the called subscriber are Answered, Declined and Answered in sequence. When the call request is set up with the caller again, the previous operation record can be displayed as "Answered for the first time, Declined for the second time and Answered for the last time", or only displayed as "Answered for the last time". The specific display contents can be selected according to actual needs.

Figure 7:
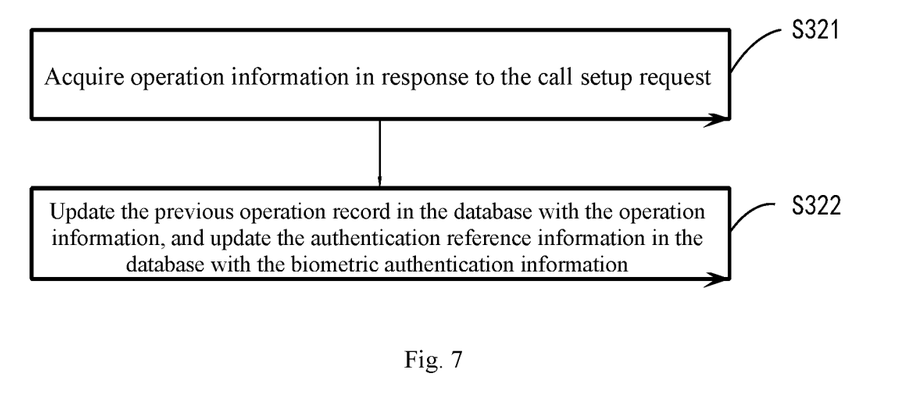
FIG. 7 is a flowchart illustrating a called terminal device updating an authentication record according to another embodiment of the present disclosure.

Referring to FIG. 7, in an embodiment, S300 includes, but is not limited to, the following steps.

At S321, operation information in response to the call setup request is acquired.

At S322, the previous operation record in the database is updated with the operation information, and the authentication reference information in the database is updated with the biometric authentication information.

In an embodiment, the operation information is the operation information in response to the call setup request, for example, may be Answer or Decline, or may be an operation of further authentication, as long as the corresponding operation buttons are displayed on the called terminal device according to actual needs. It is to be noted that the operation information may be acquired through the operation of the called subscriber, or automatically acquired in response to no operation of the user within a certain period of time. For example, if the called subscriber does not operate within a certain period of time, the called terminal device automatically declines the phone, in which case the operation information is "Decline".

In an embodiment, in S322, the previous operation record and authentication reference information in the database may be updated, or an authentication record matching the calling number information may be added. The specific method can be selected according to actual needs. If the technical scheme of adding the authentication record is used, in each authentication process, the latest authentication record may be acquired for authentication, or authentication may be performed against several authentication records in sequence to improve the authentication accuracy. The specific method can be selected according to actual needs.

In an embodiment, after the authentication result is obtained, the authentication reference information may be updated before the call setup request is responded, or the authentication reference information together with the operation information may be updated after the call setup request is responded. The specific method can be selected according to actual needs.

Figure 8:
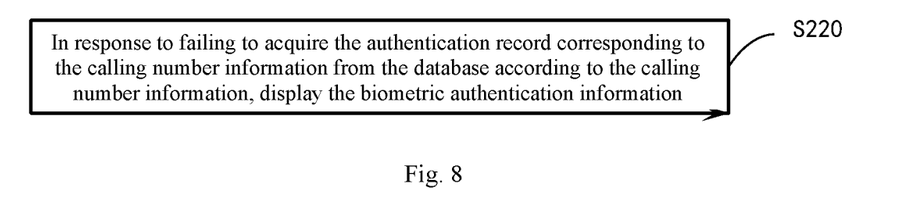
FIG. 8 is a flowchart illustrating a called terminal device executing a first-time authentication according to another embodiment of the present disclosure.

Referring to FIG. 8, in an embodiment, S200 includes, but is not limited to, the following step.

At S220, in response to the authentication record corresponding to the calling number information failing to be acquired from the database based on the calling number information, biometric authentication information is displayed.

In an embodiment, the corresponding authentication record failing to be acquired from the database according to the calling number information may be caused by the fact that it is for the first time that the calling number makes a request for setting up a call connection with the called terminal device. In this case, no authentication record is provided in the database to perform the authentication, so the biometric authentication information may be displayed on the called terminal device, such as displaying the image or video, to enable the called subscriber to perform manual authentication according to the biometric authentication information.

Figure 9:
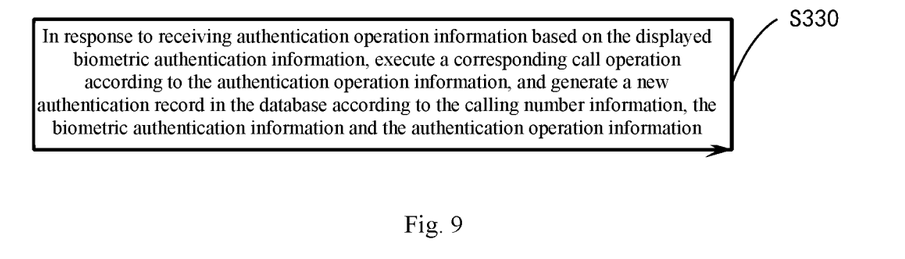
FIG. 9 is a flowchart illustrating a called terminal device generating an authentication record after the first-time authentication according to another embodiment of the present disclosure.

Referring to FIG. 9, in an embodiment, S300 includes, but is not limited to, the following step.

At S330, in response to authentication operation information based on the displayed biometric authentication information being received, a corresponding call operation is executed according to the authentication operation information, and a new authentication record is generated in the database according to the calling number information, the biometric authentication information and the authentication operation information.

Based on the above embodiments, the called subscriber may manually complete the authentication operation based on the displayed biometric authentication information. For example, corresponding Pass and Fail buttons are displayed in the called terminal device. Alternatively, the called terminal device may execute a default operation if the called subscriber makes no operation within a preset time. For example, if the called subscriber makes no operation within 20 seconds after the biometric authentication information is displayed, it is considered that the authentication fails. The specific acquisition method for the authentication operation information can be adjusted according to actual needs. It is to be noted that the generated authentication record may be in the form shown in Table 1 or may be generated according to the calling number information, the biometric authentication information and the authentication operation information, on which this embodiment does not impose restrictions.

Figure 10:
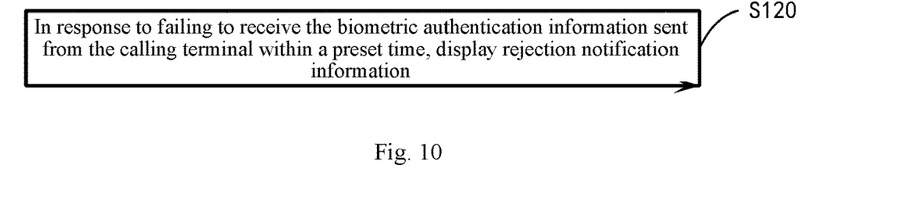
FIG. 10 is a flowchart illustrating an authentication request from a called terminal device being rejected according to another embodiment of the present disclosure.

Referring to FIG. 10, in an embodiment, S100 includes, but is not limited to, the following step.

At S120, in response to the biometric authentication information sent from the calling terminal device failing to be received within the preset time, rejection notification information is displayed.

In an embodiment, the preset time may be a set time threshold, such as 10 seconds and 20 seconds. The specific duration can be adjusted according to actual needs. The biometric authentication information sent from the calling terminal device failing to be received within the preset time may be caused by the fact that the calling terminal device performs no operation after receiving the authentication request, or that the calling terminal device rejects the authentication request. It can be considered in both cases that the caller rejects the authentication, so a rejection notification message is displayed on the called terminal device, for example, "The other party rejected the identity authentication. Please use caution!". The specific display contents can be adjusted according to actual needs, and will not be described in detail here.

Figure 11:
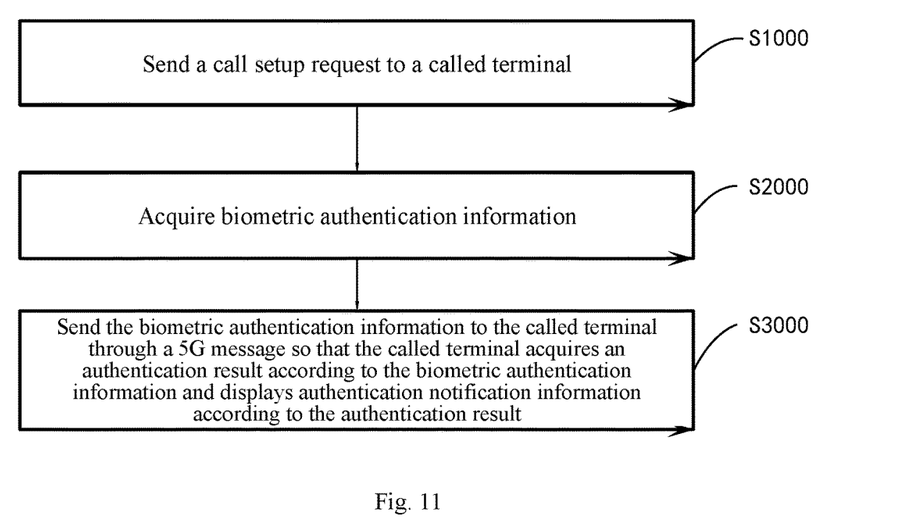
FIG. 11 is a flowchart illustrating a calling terminal device executing a call identity authentication method according to another embodiment of the present disclosure.

As shown in FIG. 11, FIG. 11 is a flowchart illustrating a calling terminal device executing a call identity authentication method according to another embodiment of the present disclosure. The call identity authentication method includes, but is not limited to, steps S1000, S2000 and S3000.

At S1000, a call setup request is sent to a called terminal device.

In an embodiment, the operation principle of sending the call setup request to the called terminal device is similar to that of receiving the call setup request by the called terminal device in the embodiment of FIG. 2 except that the execution subject is a calling terminal device. The details are not to be repeated herein.

At S2000, biometric authentication information is acquired.

In an embodiment, the biometric authentication information may be an image or a video acquired through a camera module of the calling terminal device, or may be sound information acquired through a voice module. In actual use, the calling terminal device may display biometric authentication information that can be acquired for the user to select. For example, if the mobile phone is provided with a camera and a microphone, image, video and voice acquisition options are displayed for users to select. Moreover, If the mobile phone supports fingerprint acquisition, a fingerprint acquisition option is displayed for the user to select. The specific method can be adjusted according to actual needs, on which this embodiment does not impose restrictions.

In an embodiment, The specific parameters of the biometric authentication information acquired by the calling terminal device may be arbitrary, such as an image resolution, a video duration, etc. that can be autonomously determined by the calling terminal device when being acquired. Alternatively, the corresponding required parameters may be included in the authentication request sent by the called terminal device. This embodiment does not impose restrictions on this.

At S3000, the biometric authentication information is sent to the called terminal device through the 5G message so that the called terminal device acquires the authentication result according to the biometric authentication information and displays the authentication notification information according to the authentication result.

In an embodiment, the biometric authentication information sent through the 5G message may be of any amount, such as several images, or one image and one video as long as the biometric authentication information can be used for authentication by the called terminal device. This embodiment does not impose restrictions on this.

Figure 12:
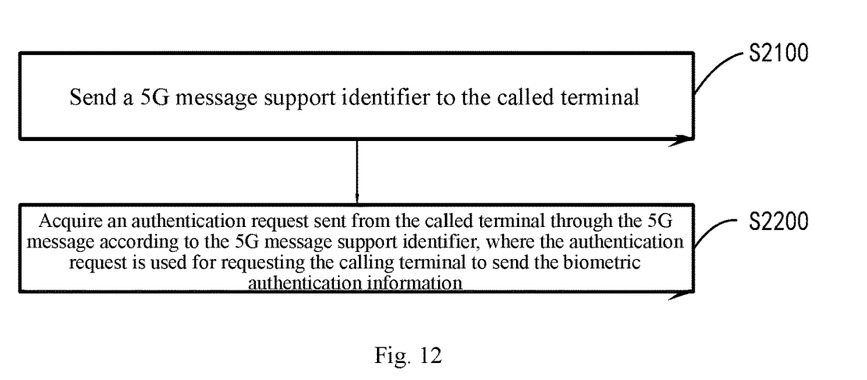
FIG. 12 is a flowchart illustrating a calling terminal device sending a 5G message support identifier according to another embodiment of the present disclosure.

Referring to FIG. 12, in an embodiment, S2000 includes, but is not limited to, the following steps.

At S2100, 5G message support identifier is sent to the called terminal device.

At S2200, an authentication request sent from the called terminal device through the 5G message is acquired according to the 5G message support identifier, where the authentication request is used for requesting the calling terminal device to send the biometric authentication information.

In an embodiment, the 5G message support identifier may be any common function identifier or an identifiable signal agreed between the terminal devices as long as the called terminal device can identify that the calling terminal device supports the 5G messaging function. The specific identifier type can be selected according to actual needs. This embodiment does not impose restrictions on this. It is to be noted that, the 5G message support identifier may be sent in any method. For example, the calling terminal device sends the 5G message support identifier to the called terminal device through the 5G message after the call request is set up. Alternatively, the 5G message support identifier is added to the call setup request to enable the called terminal device to acquire the 5G message support identifier from the call setup request. The specific sending method is selected according to actual needs as long as the 5G message support identifier can be acquired by the called terminal device.

Figure 13:
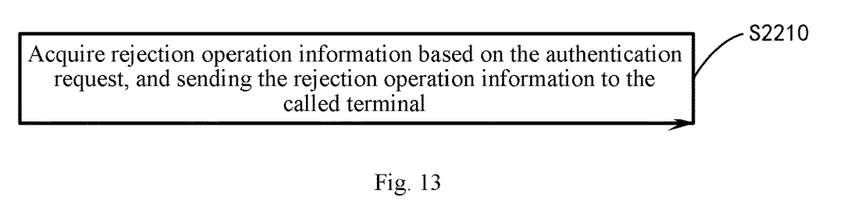
FIG. 13 is a flowchart illustrating a calling terminal device rejecting an authentication request according to another embodiment of the present disclosure.

Referring to FIG. 13, in an embodiment, S2200 includes, but is not limited to, the following step.

At S2210, rejection operation information is acquired based on the authentication request is acquired, and the rejection operation information is sent to the called terminal device.

In an embodiment, after receiving the authentication request, the calling terminal device can display a prompt message, for example, "The other party requests real person verification, agree or not?" Moreover, Accept and Reject buttons are displayed at the calling terminal device. If the Accept button is tapped, the calling terminal device starts the camera module or a recording module to acquire the biometric authentication information. If the Reject button is tapped, the rejection operation information is generated and sent to the called terminal device. The rejection operation information may be sent through the 5G message, or the calling terminal device directly terminates the call setup request after detecting the rejection operation information. The specific method can be selected according to actual needs.

Figure 14:
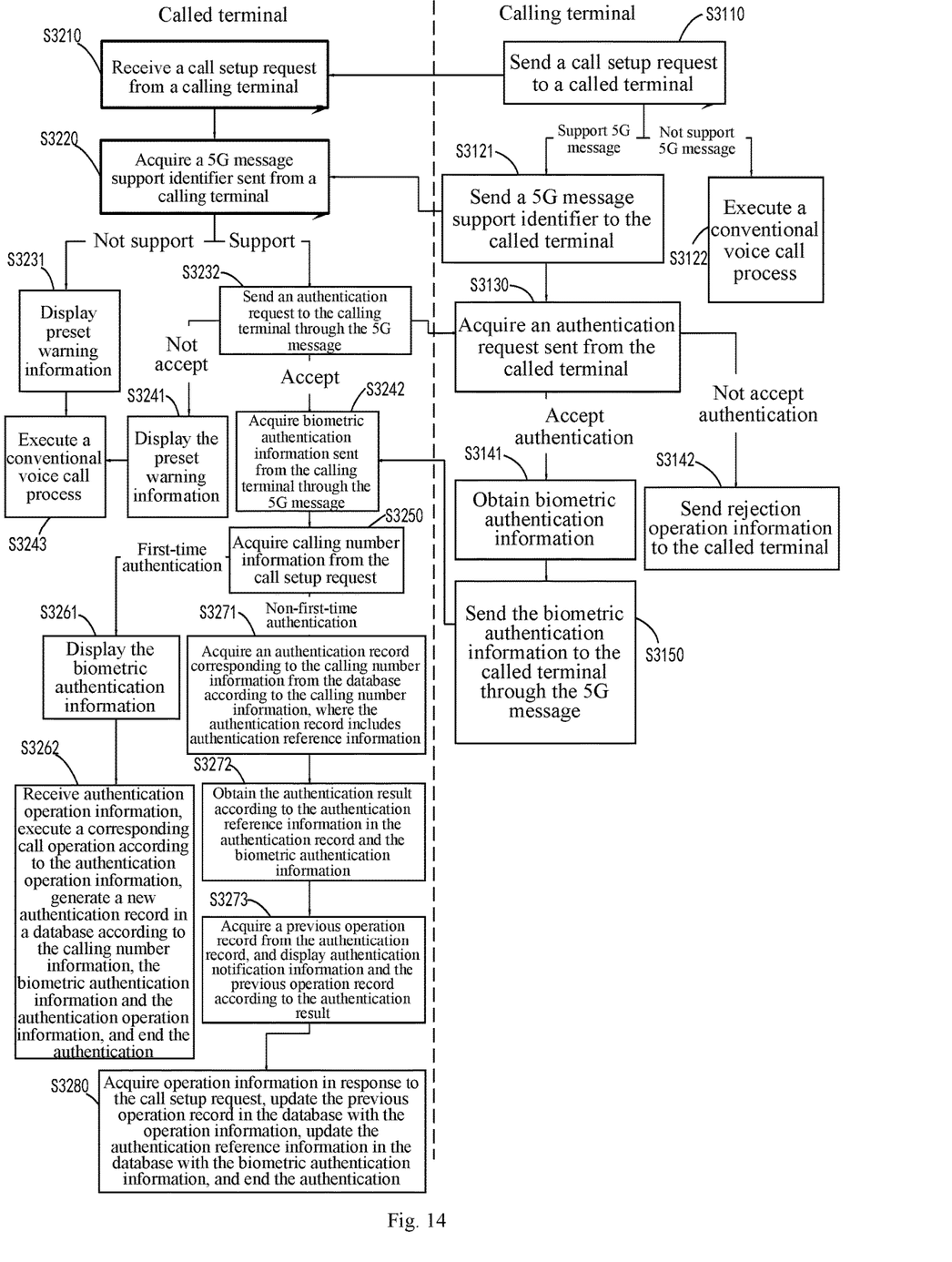
FIG. 14 is an overall flowchart of a call identity authentication method according to another embodiment of the present disclosure.

In addition, referring to FIG. 14, FIG. 14 is an overall flowchart of a call identity authentication method according to another embodiment of the present disclosure. The call identity authentication method includes the steps below.

At S3110, the calling terminal device sends the call setup request to the called terminal device. If the calling terminal device supports the 5G message, the method proceeds to S3121; and if the calling terminal device does not support the 5G message, the method proceeds to S3122.

At S3121, the calling terminal device sends the 5G message support identifier to the called terminal device, and the method proceeds to S3210.

At S3122, the calling terminal device and the called terminal device execute a conventional voice call process and do not execute the subsequent authentication operations.

At S3210, the called terminal device receives the call setup request from the calling terminal device.

At S3220, the 5G message support identifier sent from the calling terminal device is acquired. If the calling terminal device supports the 5G message, the method proceeds to S3232; and if the calling terminal device does not support the 5G message, the method proceeds to At S3231, preset warning information is displayed, and the method proceeds to S3243.

At S3232, the authentication request is sent to the calling terminal device through the 5G message, and the method proceeds to S3130.

At S3130, the authentication request sent from the called terminal device is acquired. If the authentication is accepted, the method proceeds to S3141; and if the authentication is not accepted, the method proceeds to S3142.

At S3141, the biometric authentication information is acquired, and the method proceeds to S3150.

At S3142, the rejection operation information is sent to the called terminal device, and the method proceeds to S3241.

At S3150, the biometric authentication information is sent to the called terminal device through the 5G message, the methods waits for the called terminal device proceeding to S3242.

At S3241, the preset warning information is displayed, and the method proceeds to S3243.

At S3242, the biometric authentication information sent from the calling terminal device is acquired through the 5G message, and the method proceeds to S3250.

At S3243, the called terminal device and the calling terminal device execute a conventional voice call process and do not execute the subsequent authentication operations.

At S3250, the calling number information is acquired from the call setup request. If it is a first-time authentication, the method proceeds to S3261; and if it is a non-first-time authentication, the method proceeds to S3271.

At S3261, the biometric authentication information is displayed.

At S3262, the authentication operation information is received, a corresponding call operation is executed according to the authentication operation information, and a new authentication record is generated in the database according to the calling number information, the biometric authentication information and the authentication operation information to complete the authentication.

At S3271, the authentication record corresponding to the calling number information is acquired from the database according to the calling number information, where the authentication record includes the authentication reference information.

At S3272, the authentication result is obtained according to the authentication reference information in the authentication record and the biometric authentication information.

At S3273, the previous operation record is acquired from the authentication record, and the authentication notification information and the previous operation record are displayed according to the authentication result.

At S3280, the operation information in response to the call setup request is acquired, the previous operation record in the database is updated with the operation information, and the authentication reference information in the database is updated with the biometric authentication information to complete the authentication.

It is to be noted that the biometric authentication information in the above steps may be biometric features such as images, videos and voices and can be selected according to actual needs. It is to be noted that the conventional voice call process described in S3122 and S3243 is a conventional voice phone call or a VoIP call in some cases in the field, and does not involve the subsequent identity authentication, and will not be described in detail here.

In addition, referring to FIG. 15, FIG. 15 is an example diagram of a call identity authentication method according to another embodiment of the present disclosure. The embodiments of the present disclosure are exemplified in several specific implementation scenarios. It is to be noted that in the following examples, we assume by default that the called terminal device supports the 5G messaging function, taking a short video or picture as examples of the biometric authentication information, and unnecessary details will not be given below.

Scenario One: The calling terminal device supports the 5G messaging function and is subject to a first-time authentication.

Figure 15A:
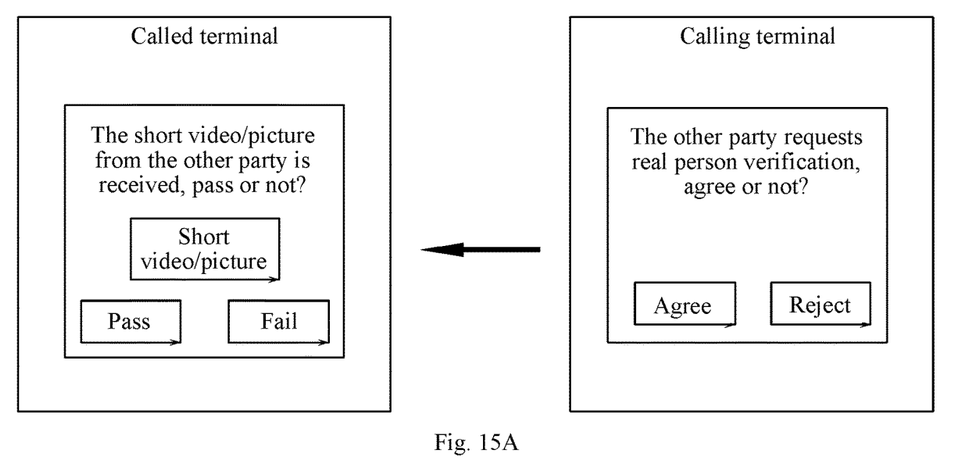
FIG. 15A is an example diagram of a call identity authentication method in Scenario One according to another embodiment of the present disclosure.

Referring to FIG. 15A, after receiving the call setup request sent from the calling terminal device, the called terminal device sends the authentication request to the calling terminal device, and the interface of the calling terminal device displays notification information: "The other party requests real person verification, agree or not?" If the user of the calling terminal device agrees, the called terminal device displays the notification information: "The short video/picture from the other party is received, pass or not?" and the short video or image is displayed on the interface of the called terminal device. After selecting to pass or fail the authentication information, the user of the called terminal device selects to answer or decline the phone according to the conventional process, and the authentication record is generated in the database for the next authentication.

Scenario Two: The calling terminal device does not support the 5G messaging function.

Figure 15B:
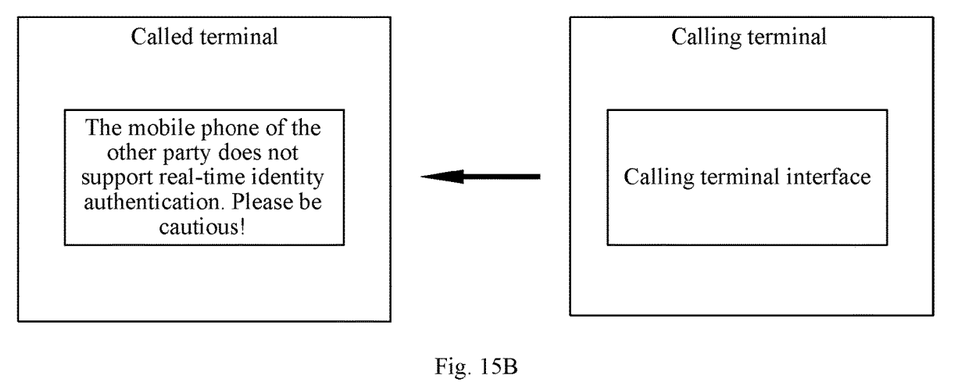
FIG. 15B is an example diagram of a call identity authentication method in Scenario Two according to another embodiment of the present disclosure.

Referring to FIG. 15B, after the called terminal device receives the call setup request, the calling terminal device does not support the 5G messaging function, so the called terminal device cannot acquire the 5G message support identifier. In this case, the interface of the calling terminal device displays a warning message: "The mobile phone of the other party does not support real-time identity authentication. Please use caution!" The user of the called terminal device may further select to answer or decline the call according to the warning information.

Scenario Three: The authentication succeeds.

Figure 15C:
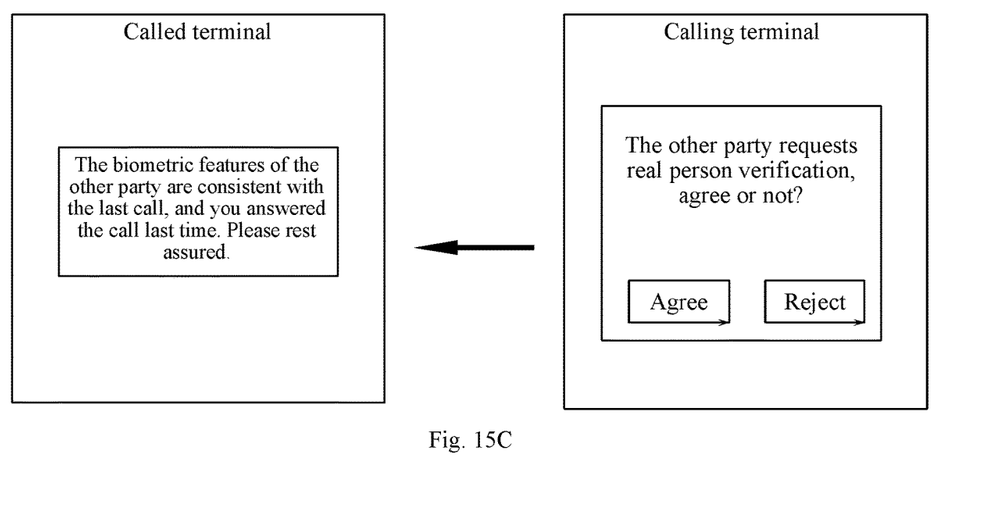
FIG. 15C is an example diagram of a call identity authentication method in Scenario Three according to another embodiment of the present disclosure.

Referring to FIG. 15C, after receiving the call setup request, the called terminal device sends the authentication request to the calling terminal device, and for the prompt for the calling terminal device to agree the authentication, please refer to the embodiment of FIG. 15A, which will not be described in detail here. After receiving the short video or image, the called terminal device reads the authentication record from the database according to the calling number information, and performs the authentication according to the reference authentication information in the authentication record and the short video or image. Once the authentication succeeds, the called terminal device reads the previous operation record and displays the authentication notification information such as "The features of the other party are consistent with the last call, and you answered the call last time. Please be assured." After the user of the called terminal device selects to answer or decline, the short video or image of this authentication is stored as the reference authentication information in the database, and the answering or declining operation this time is stored as the previous operation information in the database.

Scenario Four: The authentication fails.

Figure 15D:
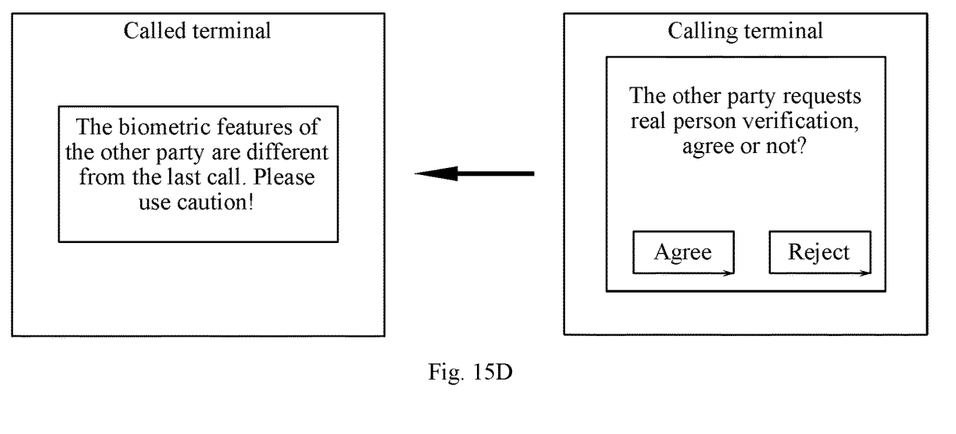
FIG. 15D is an example diagram of a call identity authentication method in Scenario Four according to another embodiment of the present disclosure.

Referring to FIG. 15D, for the overall flow, the embodiment of FIG. 15C can be referred to. The main difference is that if the authentication fails, the authentication notification information displayed by the called terminal device may be "The features of the other party are different from the last call. Please use caution!" Other processes will not be described in detail here.

In addition, an embodiment of the present disclosure also provides a terminal device including: a memory, a processor, and a computer program stored in the memory and executable by the processor.

The processor and the memory may be connected by a bus or by other means.

It is to be noted that the terminal device in this embodiment can constitute a part of the terminal device in the embodiment shown in FIG. 1, and these embodiments are of the same inventive concept. Therefore, these embodiments have the same implementation principles and technical effects, and details will not be repeated herein.

The memory stores the non-transitory software program and instructions required for implementing the call identity authentication method of any of the embodiments, which, when executed by the processor, cause the processor to perform the call identity authentication method applied to a terminal device of any of the embodiments, for example, to execute S100 to S300 in FIGS. 2, S111 to S112 in FIG. 3, S113 in FIGS. 4, S211 to S213 in FIGS. 5, S311 to S312 in FIGS. 2, S321 to S322 in FIG. 7, S220 in FIG. 8, S330 in FIG. 9, S120 in FIGS. 10, S1000 to S3000 in FIGS. 11, S2100 to S2200 in FIG. 12, S2210 in FIGS. 13, and S3110 to S3280 in FIG. 14 described above.

The apparatus embodiments described above are only for illustration. The units described as separate components may or may not be physically separated, that is, they may be located at one place or distributed to multiple network units. Some or all of the modules can be selected according to actual needs to achieve the purpose of this embodiment.

Furthermore, an embodiment of the present disclosure also provides a computer-readable storage medium storing computer-executable instructions which, when executed by a processor or a controller, for example, by the processor of the control unit in any of the above-described embodiments, cause the processor or controller to execute the call identity authentication method applied to a terminal device in any of the above-described embodiments, for example, to execute S100 to S300 in FIGS. 2, S111 to S112 in FIG. 3, S113 in FIGS. 4, S211 to S213 in FIGS. 5, S311 to S312 in FIGS. 2, S321 to S322 in FIG. 7, S220 in FIG. 8, S330 in FIG. 9, S120 in FIGS. 10, S1000 to S3000 in FIGS. 11, S2100 to S2200 in FIG. 12, S2210 in FIGS. 13, and S3110 to S3280 in FIG. 14 described above.

The embodiments of the present disclosure include: in response to receiving a call setup request from a calling terminal device, acquiring the biometric authentication information sent from the calling terminal device through the 5G message; obtaining the authentication result according to the biometric authentication information; and displaying authentication notification information according to the authentication result. According to the technical schemes provided by the embodiments of the present disclosure, the called terminal can acquire, before the call is set up, the biometric authentication information of the caller through the 5G message to authenticate the identity of the caller, effectively improving the user experience.

It can be understood by those having ordinary skill in the art that all or some of the steps of the methods and systems disclosed above can be implemented as software, firmware, hardware, and appropriate combinations thereof. Some or all of the physical components may be implemented as software executed by a processor, such as a central processing unit, a digital signal processor or a microprocessor, or as hardware, or as an integrated circuit, such as an application-specific integrated circuit. Such software can be distributed on computer-readable media, which can include computer-readable storage media (or non-transitory media) and communication media (or transitory media). As well known to those having ordinary skill in the art, the term computer-readable storage medium includes volatile and nonvolatile, removable and non-removable media implemented in any method or technique for storing information, such as computer-readable instructions, data structures, program modules or other data. A computer storage medium includes but is not limited to RAM, ROM, EEPROM, flash memory or other memory technologies, CD-ROM, digital versatile disk (DVD) or other optical disk storage, cassettes, magnetic tapes, magnetic disk storage or other magnetic storage devices, or any other medium that can be configured to store desired information and can be accessed by a computer. Furthermore, it is well known to those having ordinary skill in the art that communication media typically contain computer-readable instructions, data structures, program modules or other data in a modulated data signal such as a carrier wave or other transmission mechanism, and can include any information transmission media.

The above is a detailed description of some embodiments of the present disclosure, but the present disclosure is not limited to the above-mentioned embodiments. Those having ordinary skill in the art can also make various equivalent modifications or replacements without departing from the scope of the present disclosure, and these equivalent modifications or replacements are all included in the scope defined by the claims of the present disclosure.

What is claimed is:

1. A call identity authentication method, which is applied to a called terminal device, the method comprising:
   in response to receiving a call setup request from a calling terminal device, acquiring biometric authentication information sent from the calling terminal device through a fifth generation (5G) message;
   acquiring calling number information from the call setup request;
   acquiring, according to the calling number information, an authentication record corresponding to the calling number information from a database, wherein the authentication record comprises authentication reference information; and
   obtaining an authentication result according to the authentication reference information in the authentication record and the biometric authentication information; and
   displaying authentication notification information according to the authentication result.

2. The call identity authentication method of claim 1, before acquiring biometric authentication information sent from the calling terminal device through a 5G message, the method further comprising:
   acquiring a 5G message support identifier sent from the calling terminal device; and
   sending, according to the 5G message support identifier, an authentication request to the calling terminal device through the 5G message, wherein the authentication request is used for requesting the calling terminal device to send the biometric authentication information.

3. The call identity authentication method of claim 2, further comprising:
   in response to failing to acquire the 5G message support identifier, displaying preset warning information.

4. The call identity authentication method of claim 2, further comprising:
   in response to failing to receive the biometric authentication information sent from the calling terminal device within a preset time, displaying rejection notification information.

5. The call identity authentication method of claim 1, wherein displaying authentication notification information according to the authentication result comprises:
   acquiring a previous operation record from the authentication record; and
   displaying the previous operation record.

6. The call identity authentication method of claim 5, after displaying authentication notification information according to the authentication result, the method further comprising:
   acquiring operation information in response to the call setup request; and
   updating the previous operation record in the database with the operation information, and updating the authentication reference information in the database with the biometric authentication information.

7. The call identity authentication method of claim 1, further comprising:
   in response to failing to acquire the authentication record corresponding to the calling number information from the database according to the calling number information, displaying the biometric authentication information.

8. The call identity authentication method of claim 7, after displaying the biometric authentication information, the method further comprising:
   in response to receiving authentication operation information based on the displayed biometric authentication information, executing a corresponding call operation according to the authentication operation information, and generating a new authentication record in the database according to the calling number information, the biometric authentication information and the authentication operation information.

9. A terminal device, comprising:
   a memory, a processor, and a computer program stored in the memory and executable by the processor, wherein the computer program, when executed by the processor, causes the processor to perform the call identity authentication method of claim 1.

10. A non-transitory computer-readable storage medium storing computer-executable instructions, wherein the computer-executable instructions are configured to implement the call identity authentication method of claim 1.

11. A call identity authentication method, which is applied to a calling terminal device, the method comprising:
    sending a call setup request to a called terminal device;
    acquiring biometric authentication information; and
    sending the biometric authentication information to the called terminal device through a 5G message so that the called terminal device:
    acquires calling number information from the call setup request,
    acquires, according to the calling number information, an authentication record corresponding to the calling number information from a database, wherein the authentication record comprises authentication reference information,
    obtains an authentication result according to the authentication reference information in the authentication record and the biometric authentication information, and
    displays authentication notification information according to the authentication result.

12. The call identity authentication method of claim 11, before acquiring biometric authentication information, the method further comprising:
- sending a 5G message support identifier to the called terminal device; and
- acquiring an authentication request sent from the called terminal device through the 5G message according to the 5G message support identifier, wherein the authentication request is used for requesting the calling terminal device to send the biometric authentication information.

13. The call identity authentication method of claim 12, after acquiring an authentication request sent from the called terminal device through the 5G message according to the 5G message support identifier, the method further comprising:
- acquiring rejection operation information based on the authentication request, and sending the rejection operation information to the called terminal device.

14. A terminal device, comprising:
- a memory, a processor, and a computer program stored in the memory and executable by the processor, wherein the computer program, when executed by the processor, causes the processor to perform the call identity authentication method of claim 11.

15. A non-transitory computer-readable storage medium storing computer-executable instructions, wherein the computer-executable instructions are configured to implement the call identity authentication method of claim 11.

* * * * *